US007398835B2

(12) United States Patent
Stirm

(10) Patent No.: US 7,398,835 B2
(45) Date of Patent: Jul. 15, 2008

(54) ROTARY HAMMER HAVING BOTH A RECIPROCATING HAMMER MECHANISM AND A RATCHETING HAMMER MECHANISM

(75) Inventor: Michael Stirm, Oberursel (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/339,434

(22) Filed: Jan. 25, 2006

(65) Prior Publication Data

US 2006/0162943 A1 Jul. 27, 2006

(30) Foreign Application Priority Data

Jan. 26, 2005 (GB) ................................ 0501617.5

(51) Int. Cl.
*B23B 45/16* (2006.01)
*B25D 11/12* (2006.01)
*B25D 16/00* (2006.01)

(52) U.S. Cl. .......................... 173/48; 173/114; 173/205

(58) Field of Classification Search ................... 173/48, 173/47, 104, 109, 114, 205
See application file for complete search history.

(56) References Cited

U.S. PATENT DOCUMENTS 5,201,373 A * 4/1993 Bloechle ..................... 173/109
5,277,259 A * 1/1994 Schmid et al. ................ 173/13
5,373,905 A * 12/1994 Bleicher et al. ............. 173/109
5,806,609 A * 9/1998 Stock et al. ................. 173/205
5,820,312 A * 10/1998 Stock et al. ................... 408/17
6,213,222 B1 * 4/2001 Banach .......................... 173/1
6,913,089 B2 * 7/2005 Stirm ........................ 173/104

FOREIGN PATENT DOCUMENTS

| | | |
|---|---|---|
| EP | 0613 758 A1 | 9/1994 |
| FR | 1 239 679 A | 8/1960 |
| FR | 2 778 862 A | 11/1999 |
| GB | 713018 | 8/1954 |
| GB | 902545 | 8/1962 |
| JP | 3 43164 | 2/1991 |
| JP | 4 111783 | 4/1992 |

* cited by examiner

*Primary Examiner*—Stephen F Gerrity
(74) *Attorney, Agent, or Firm*—Michael P. Leary; Adan Ayala

(57) ABSTRACT

A rotary hammer incorporating both a reciprocating drive for generating a first hammering action transmittable to a tool bit and ratcheting mechanism for generating a second hammering action transmittable to the tool bit. The first hammering action and the second hammering actions differing in frequency and force of the impacts transmitted to the tool bit. Furthermore, the reciprocating drive and ratcheting mechanism are selectably engageable so that the first hammering action and the second hammering action may be selectably transmitted to the tool bit individually or in combination depending on the desired mode operation.

14 Claims, 2 Drawing Sheets

ROTARY HAMMER HAVING BOTH A RECIPROCATING HAMMER MECHANISM AND A RATCHETING HAMMER MECHANISM

FIELD OF THE INVENTION

The present invention relates to powered rotary hammers, and to power drills having a hammer action.

BACKGROUND OF THE INVENTION

One type of rotary hammers comprise a motor which rotatingly drives a spindle supporting a chuck in which a drill bit can be held, while at the same time causing a piston tightly fitted within the spindle to execute a linear reciprocating motion within the spindle. This motion causes repeated compression of an air cushion between the piston and a ram slidably mounted within the spindle, which causes the ram in turn to execute reciprocating linear motion within the spindle and apply impacts to the drill bit via a beat piece.

The problem with such designs is that the frequency of impacts per revolution of the spindle is relatively small.

In an alternative design of hammer drill, the impacts which are imparted onto the drill bit are generated using two ratchet plates which interact with each other, one of which is fixed, the other rotating with the spindle, the vibrations generated by two ratchets being transferred to the drill bit. EP0613758 discloses such a design.

Though this design produces a high frequency of impacts per revolution of the spindle, the size of the impacts is relatively small.

BRIEF SUMMARY OF THE INVENTION

Accordingly there is provided a rotary hammer comprising:

a housing a motor mounted within the housing;

a tool holder rotatably mounted on the housing for holding a cutting tool;

a striker mounted in a freely slideable manner within the housing for repetitively striking, at a relatively low frequency, an end of a cutting tool when a cutting tool is held by the tool holder, wherein the striker is reciprocatingly driven by the motor, when the motor is activated, via a drive mechanism;

wherein the striker strikes an end of a cutting tool via a beat piece slideably mounted within the housing;

characterised in that the beat piece is capable of being rotatingly driven by the motor whereby there is further provided a pair of co-operating ratchet plates the first ratchet plate being rigidly connected to the beat piece and the second ratchet plate being connected to the housing 4 and which, when the first and second ratchet plates are engaged and the beat piece is rotatingly driven by the motor, superimpose high frequency impacts onto the low frequency impacts generated by the striker, when the striker is being reciprocatingly driven by the motor.

Preferably, the drive mechanism comprises, a support which is capable of being reciprocatingly driven by the motor, ideally by a wobble bearing or a crank mechanism, when the motor is activated; and a spring interconnected between the support and the striker.

Tool holders for rotary hammers typically support the end of a drill bit in such a manner that the drill bit can axially slide within the tool holder over a limited range of distance whilst being rotationally fixed within the tool holder. When the tool holder rotates, the drill bit rotates. In such designs, the end of the drill bit is directly struck by the beat piece. As the drill bit can axially slide within the tool holder, no impact force is imparted on to the tool holder itself. The present invention can be utilised with such tool holders, the beat piece striking the end of the tool bit directly. However, the present invention also allows for the end of the tool bit to be struck indirectly, ie via another component such as the tool holder. In such an arrangement, the tool holder can be attached to the beat piece with the impacts being transferred to the cutting tool via the tool holder.

Preferably, the ratchet plates are biased apart and are only brought into engagement when a force is applied to the beat piece which over comes the biasing force.

BRIEF DESCRIPTION OF THE DRAWINGS

An embodiment of the present invention will now be described with reference to the accompanying drawings of which.

DETAILED DESCRIPTION OF THE INVENTION

A rotary hammer drill comprises a housing 2 in which is mounted an electric motor. A chuck support 120 is rotatingly mounted within the housing 2, one end of which projects from the front of the housing. A chuck 4 is attached to the end of the chuck support 120. The electric motor is capable of rotatingly driving the chuck support 120 in order for the hammer to perform a drilling function. In addition, the motor can also reciprocatingly drive a ram 142 via a drive mechanism to repetitively strike the chuck support 120. The impulses on the chuck support 120 are transferred to the rear end of a drill bit located within the chuck 4 in order for the drill bit to perform a chiselling function. A gear mechanism (not shown) is capable of engaging or disengaging the drive to either the chuck support 120 and/or the ram 142 so that the rotary hammer is capable of performing the drilling function and chiselling function separately or in combination.

Figure 1:
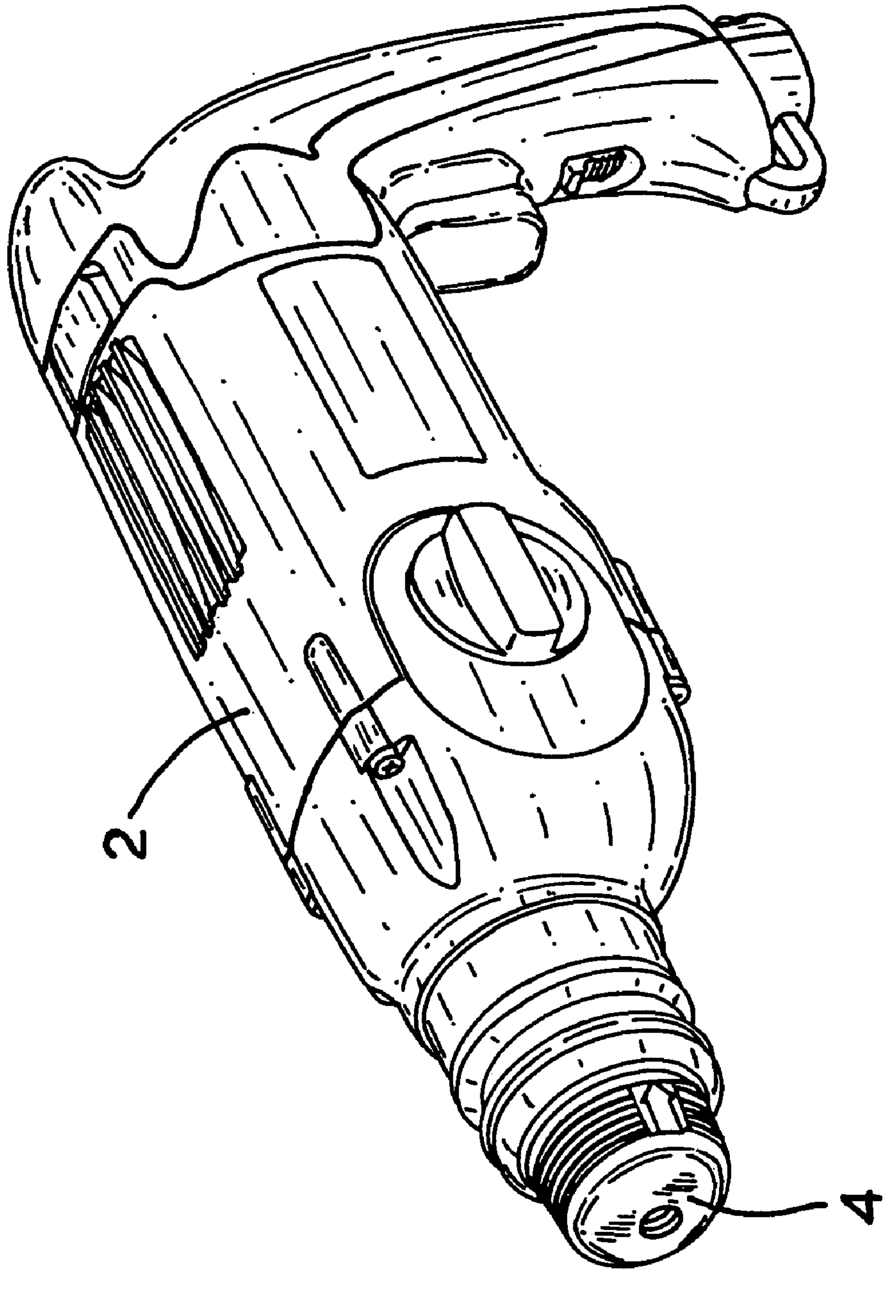
FIG. 1 shows a perspective view of a hammer.
Figure 2:
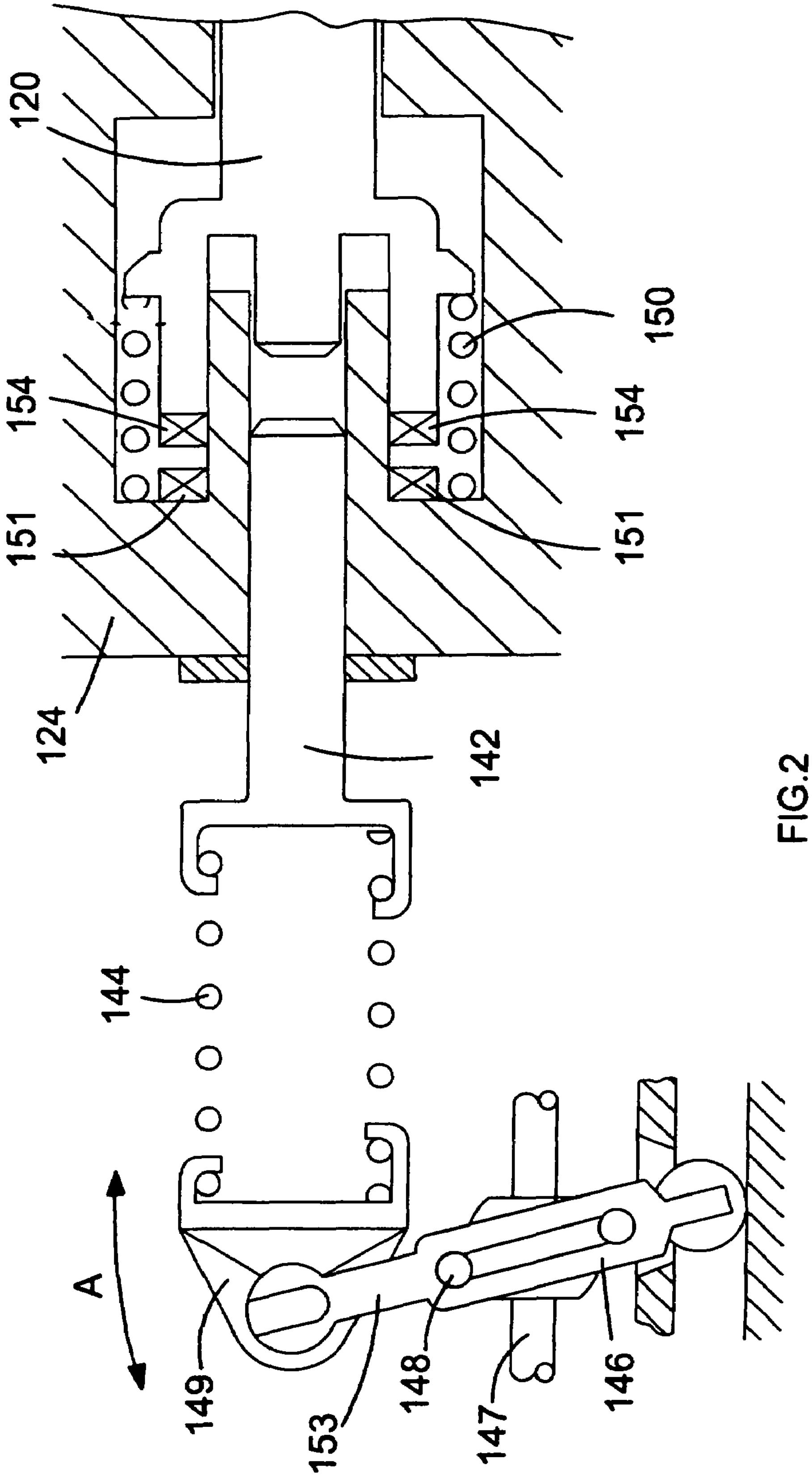
FIG. 2 is a schematic cross sectional side view of a hammer mechanism of a rotary hammer of the present invention.

FIG. 2 shows a schematic side cross sectional view of a hammer mechanism of the hammer.

A wobble plate 146 is mounted to a rotary shaft 147 by means of bearings 148. The wobble plate is prevented from rotation around the axis of the shaft 147. A support 149 is pivotably connected to an arm 153 of the wobble plate 146 remote from the shaft 147 such that rotation of the shaft 147 by means of the motor causes axial reciprocating motion of the upper extremity of the arm 153 of the wobble plate 146 in a direction indicated by Arrow A in FIG. 2. This in turn causes reciprocating motion of a ram 142 connected via a spring 144 to the support 149. As a result, the ram 142 repeatedly strikes a chuck support 120 whose forward (right in FIG. 2) impulses are transferred to the drill bit (not shown) held by the chuck 4 attached to the end of the chuck support 120.

A person skilled in the art will appreciate that the wobble bearing can be replaced by a crank mechanism.

The chuck support 120 is mounted within a mount 124. The mount 124 is rigidly attached to the housing 4. The chuck support 120 is capable of freely rotating as well as axially sliding within the mount 124. A compression spring 150 biases the chuck support forward (right in FIG. 2) in a direction parallel to its axis. The amount of forward axial movement is limited by the mount 124. The chuck support 120 is capable of being rotatingly driven within the mount 124 by the motor of the hammer. Details of the rotary drive mechanism have omitted for clarity. Any type of drive which will be well known to a person skilled in the art can be used.

An annular first ratchet plate 154 is integrally formed on rear end of the chuck support 120. An annular second ratchet plate 151 is integrally formed on the mount 124. The compression spring biases the two ratchet plates 154, 151 apart.

The hammer mechanism can be operated in at least two different manners of operation. In the first manner, the motor drives both the chuck support 120 in a rotating manner and the ram 142 in a reciprocating manner.

In use in the first manner, a drill bit is held by the chuck 4. When the end of the drill bit is placed against the surface of a work piece in order to drill a hole, the chuck support is biased forward to its furthest extent. The drill bit is rotatingly driven by the chuck support 120. When the shaft 147 is rotatingly driven by the motor, the ram 142 is reciprocatingly driven by the wobble plate 146 via the support 149 and the spring 144. However, the hammer mechanism is arranged so that the ram 142 either very narrowly misses the chuck support 120 when it is in its forward most position or just touches the chuck support when it is in its forward (right in FIG. 2) most position. As such, no forward impulses are generated which would be passed forward to the drill bit.

However, when an operator applies further pressure onto the drill bit through the hammer in order to push the tip of the drill bit into the work piece to be drilled, the chuck support 120 slides backwards against the biasing force of the spring 150. This results in the reciprocatingly driven ram 142 to strike the chuck support 120. The impulses generated by this striking action are then passed onto the chuck 4. As such, a hammer action is superimposed onto the drill bit as it is pressed against a work piece. It should be noted that a chuck 4 needs to be constructed in a sufficiently robust manner in order to withstand the impacts imparted by the reciprocating ram 142 over a long period of time.

If sufficient force is applied onto the drill bit, the chuck support slides rearwardly (left in FIG. 2) to its maximum extent until the two ratchet plates 151, 154 engage. As the chuck support 120 is being rotatingly driven, the ratchet plates 151, 154 will ride over each other causing the chuck support 120 to oscillate. The oscillating motion will be superimposed onto the hammer motion caused by the striking of the ram 142. The frequency of the oscillation due to the ratchet plates 151, 154 will be much higher than that caused by the striking action of the ram 142 but will be much smaller in amplitude.

In the second manner of operation, the motor initially drives the chuck support 120 in a rotating manner, no drive being applied to the ram 142.

In use in the second manner, a drill bit is held by the chuck 4. When the end of the drill bit is placed against the surface of a work piece in order to drill a hole, the chuck support is biased forward to its furthest extent. The drill bit is rotatingly driven by the chuck support 120. No forward impulses are generated which would be passed forward to the drill bit.

If sufficient force is applied onto the drill bit, the chuck support slides rearwardly (left in FIG. 2) to its maximum extent until the two ratchet plates 151, 154 engage. As the chuck support 120 is being rotatingly driven, the ratchet plates 151, 154 will ride over each other causing the chuck support 120 to oscillate. The oscillating motion will be superimposed onto the rotating motion of the bit.

However, if for a short period of time the operator wishes to increase the hammering action, the operator can engage the drive to the ram 142 to cause it to reciprocate. This results in the reciprocatingly driven ram 142 striking the chuck support 120. The impulses generated by this striking action are then passed onto the chuck 4. As such, a larger hammer action is superimposed onto the drill bit as it is pressed against a work piece.

The second manner of operation allows the action of the reciprocating ram 142 to be used sparingly, thus enabling a standard design of chuck to be utilised without damage due to the large vibration caused by the ram 142. If the hammer mechanism is intended to be used predominantly in the second manner of operation, the strength of the spring can be reduced to allow easy engagement of the ratchet plates 151, 154.

The present invention has been described in relation to a chuck mounted on the chuck support. However, a person skilled in the art will realise that it can also be utilised with typical tool holders for rotary hammers which support the end of a drill bit in such a manner that the drill bit can axially slide within the tool holder over a limited range of distance whilst being rotationally fixed within the tool holder. When the tool holder rotates, the drill bit rotates. When such designs of tool holders are used, the end of the drill bit is directly struck by the chuck support 120. As the drill bit can axially slide within the tool holder, no impact force is imparted on to the tool holder itself. The chuck support and the tool holder will be separately rotatingly driven. The tool holder will be rotatingly driven to rotate the bit. The chuck support 120 will rotatingly driven to generate the hammering effect due to the ratchet plates 151, 154.

The invention claimed is:

1. A rotary hammer comprising:

a housing;

a motor mounted within the housing;

a tool holder support rotatably mounted on the housing and rotatably drivable by the motor;

a tool holder connected to the distal end of the tool holder support;

a ratcheting mechanism, including a rotationally fixed set of teeth engageable with a selectably rotatable set of teeth, for selectably generating a first hammering action transmittable to the tool holder; and a reciprocating drive mechanism including a striker mounted in a freely slideable manner within the housing for selectably generating a second hammering action transmittable to the tool holder.

2. A rotary hammer according to claim 1 wherein the ratcheting mechanism includes:

said rotationally fixed set of teeth comprising a first ratchet plate connected to the housing;

said selectably rotatable set of teeth comprising a second ratchet plate connected to the tool holder support; and wherein the first hammering action is generated when the first ratchet plate is engaged with the second ratchet plate and the tool holder support is rotatingly driven by the motor.

3. A rotary hammer according to claim 2 wherein the first ratchet plate and the second ratchet plate are biased apart by a biasing element and are only brought into engagement when a load force is applied to the tool holder support and over comes the biasing element.

4. A rotary hammer according to claim 1 wherein the reciprocating drive mechanism includes:

a support reciprocatingly drivable by the motor; and a spring interconnected between the support and the striker.

5. A rotary hammer according to claim 4 wherein the support is reciprocatingly driven by the motor via a wobble bearing.

6. A rotary hammer according to claim 4 wherein the support is reciprocatingly driven by the motor via a means for converting a rotary output of the motor into reciprocating motion of the support.

7. A rotary hammer according to claim 6 wherein the means for converting a rotary output of the motor into reciprocating motion of the support is a wobble drive assembly.

8. A rotary hammer according to claim 1 wherein the reciprocating drive mechanism and the ratcheting mechanism are selectably operable for creating one of a first mode of operation and a second mode of operation, and wherein during the first mode of operation only the first hammering action is transmitted to the tool holder and wherein during the second mode of operation both the first hammering action and the second hammering action are transmitted to the tool holder.

9. A rotary hammer according to claim 1 wherein the first hammering action is independently selectably operable without the second hammering action.

10. A rotary hammer according to claim 1 wherein the second hammering action is superimposed on the first hammering action.

11. A rotary hammer comprising:

a housing;

a motor mounted within the housing;

a tool holder support rotatably mounted on the housing and rotatably drivable by the motor;

a tool holder connected to the distal end of the tool holder support;

a ratcheting mechanism for selectably generating a first hammering action transmittable to the tool holder:

a reciprocating drive mechanism for selectably generating a second hammering action transmittable to the tool holder, the reciprocating drive mechanism including a wobble drive assembly, a support, and a striker mounted in a freely slideable manner within the housing.

12. A rotary hammer according to claim 11 wherein the ratcheting mechanism includes:

a first ratchet plate connected to the housing;

a second ratchet plate connected to the tool holder support; and wherein the first hammering action is generated when the first ratchet plate is engaged with the second ratchet plate and the tool holder support is rotatingly driven by the motor.

13. A rotary hammer according to claim 12 wherein the first ratchet plate and the second ratchet plate are biased apart by a biasing element and are only brought into engagement when a load force is applied to the tool holder support and over comes the biasing element.

14. A rotary hammer according to claim 11 wherein the reciprocating drive mechanism and the ratcheting mechanism are selectably operable for creating one of a first mode of operation and a second mode of operation, and wherein during the first mode of operation only the first hammering action is transmitted to the tool holder and wherein during the second mode of operation both the first hammering action and the second hammering action are transmitted to the tool holder.

* * * * *